United States Patent [19]

Este

[11] 4,433,386
[45] Feb. 21, 1984

[54] SURFACE RELIEF MEASURING EQUIPMENT

[75] Inventor: Grantley O. Este, Kanata, Canada

[73] Assignee: Northern Telecom Limited, Montreal, Canada

[21] Appl. No.: 214,221

[22] Filed: Dec. 8, 1980

[30] Foreign Application Priority Data

Oct. 1, 1980 [CA] Canada .................................. 361296

[51] Int. Cl.³ .............................................. G01B 7/06
[52] U.S. Cl. ...................................... 364/563; 73/105
[58] Field of Search .................. 364/559, 560, 563; 324/229–231; 73/105; 235/92 DN, 92 MT; 377/19, 24

[56] References Cited

U.S. PATENT DOCUMENTS

| | | | |
|---|---|---|---|
| 3,670,153 | 6/1972 | Rempert et al. | 364/559 |
| 3,683,273 | 8/1972 | Behr et al. | 324/229 |
| 3,720,818 | 3/1973 | Spragg et al. | 73/105 |
| 3,968,681 | 7/1976 | Cornforth et al. | 324/229 |
| 4,126,036 | 11/1978 | Nilan et al. | 73/105 |
| 4,133,204 | 1/1979 | Mittleman | 73/105 |
| 4,154,530 | 5/1979 | Connolly, Jr. et al. | 364/559 |
| 4,162,528 | 7/1979 | Maldonado et al. | 364/563 |
| 4,328,553 | 5/1982 | Fredriksen et al. | 364/559 |

OTHER PUBLICATIONS

"A Comparison of Methods for Accurate Film Thickness Measurement" by King et al., Published in Journal of Physics E. Scientific Instruments 1972, vol. 5, pp. 445–449.

Primary Examiner—Gary Chin
Attorney, Agent, or Firm—Stuart L. Wilkinson

[57] ABSTRACT

Surface relief analyzing equipment comprises a turntable and an audio frequency pick-up including a stylus. A substrate bearing the surface relief is rotated on the turntable at a fixed frequency and and analogue electrical signal produced at a pick-up transducer is passed through an a-d converter. Digital data is processed to produce an input to a display for registering a pictorial representation of the surface relief.

8 Claims, 2 Drawing Figures

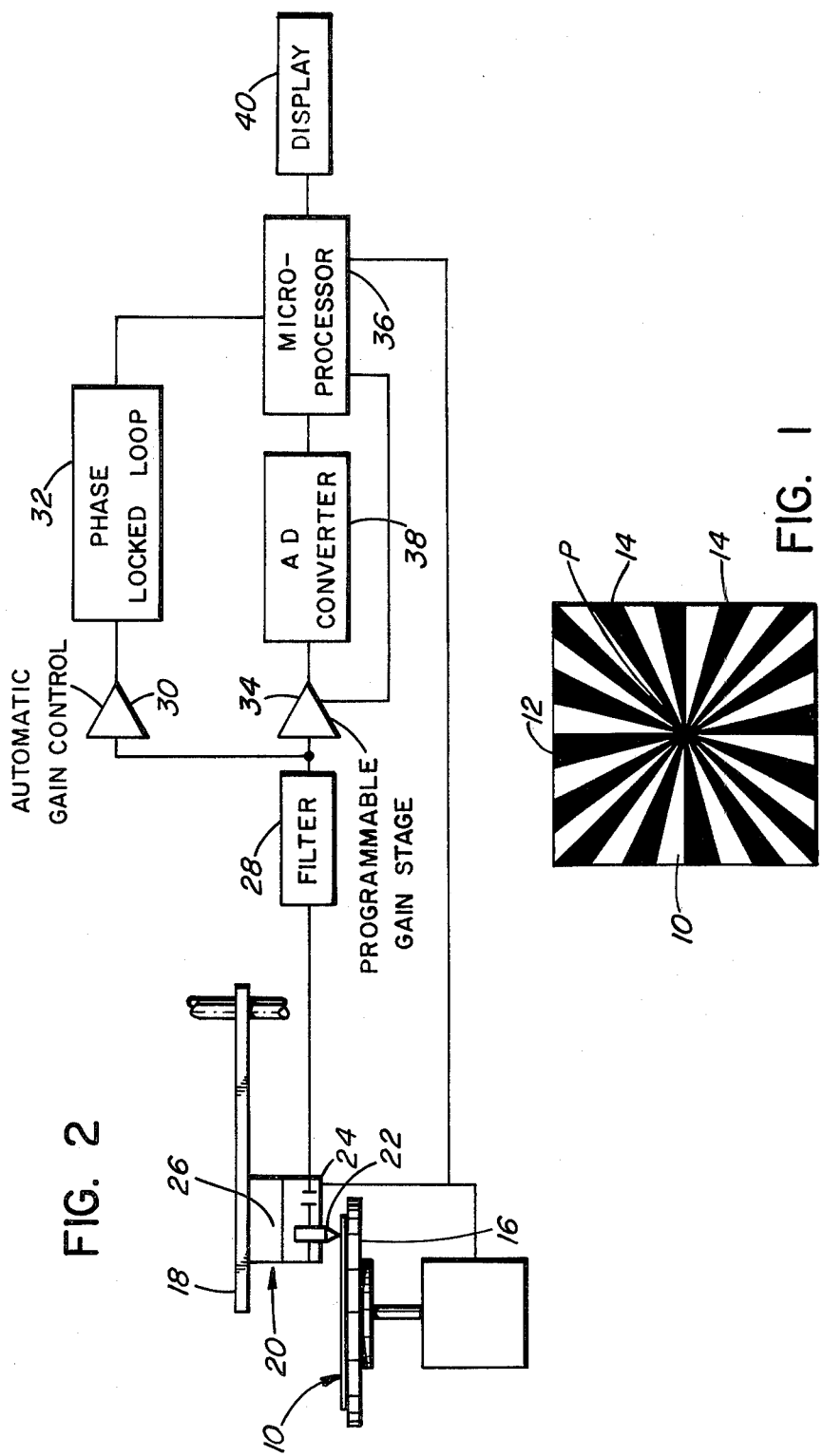

SURFACE RELIEF MEASURING EQUIPMENT

This invention relates to apparatus for analyzing surface relief and has particular application to measuring variation in thickness of thin and thick film components used in electrical circuits.

A known method of film thickness measurement uses a mechanical probe which is drawn across the surface of the film after it has been etched to produce steps. As the probe climbs or drops at the edge of a step, movement of the probe is converted, for example, capacitively, to give an electrical representation of the position of the film surface relative to the substrate surface. The technique is laborious to set up and each set-up position is valid only for measurement taken at a localized region of the substrate. Moreover, resolution is limited to approximately 10 nm.

In another known method, an optical flat is used to produce interference fringes from a film deposited on a substrate. To obtain interference fringes, it is necessary that the film and substrate either be reflective or be coated with a reflective material. A pattern of fringes is photographed and fringe spacing measured. As in the previous method, several separated measurements are needed to obtain a useful thickness profile and the method is slow, resolution being again in the order of 10 nm. In addition, some ambiguity is entailed in the measurement of thick films. Thus, if the thick film is etched, fringe offset at a discontinuity between film and substrate may be difficult to determine if the fringes are identical in appearance.

Finally, the most precise method currently known with a resolution better than 1 nm is elipsometry. This technique is based on the rotation by a film of the plane of polarization of reflected polarized light. Again, the technique is somewhat expensive and tedious to implement. Further, it is limited to transparent films of known optical density. Since the optical density of thin films is indefinite, the method becomes essentially comparative rather than providing absolute thickness measurements.

A technique which is simple to implement and uses inexpensive equipment is now proposed, the technique being of a dynamic character in contrast to the static measurement procedures briefly described above.

According to the invention there is provided relief measuring apparatus comprising:

support means for supporting a substrate having a surface relief pattern varying in height relative a reference plane;

tracking means mounted adjacent to said support means said tracking means reciprocable in a direction perpendicular to the reference plane for tracking variation in height of an immediately adjacent point of the surface;

means for relatively moving the tracking means and the substrate in a plane parallel to the reference plane to obtain periodic transversal of a part of the surface by the tracking means;

a transducer operably connected to the tracking means for generating a periodic electrical signal corresponding to variation in height of the tracking means produced by movement of the substrate relative thereto;

signal analyzing means for deriving from said periodic signal data representing variation in height of the surface as a function of position and;

display means for displaying said data.

The support means is preferably a turntable. The tracking means can comprise a mechanical stylus and the transducer can comprise a piezoelectric transducer, the stylus and the transducer housed within a cartridge mounted on an arm spaced from the upper surface of the turntable, the arm extending parallel to a diameter of the turntable.

The arm preferably also mounts a motor for moving the cartridge along the arm.

The signal analyzing means preferably includes an analog-to-digital converter for digitizing an output from the transducer. The analyzing means can also include a phase locked loop for deriving timing control from the periodic signal produced by such a transducer. For this purpose the pattern should preferably be circularly symmetric, the substrate mounted so that the axis of symmetry is aligned with the axis of rotation of the turntable.

An embodiment of the invention will now be described by way of example with reference to the accompanying drawings in which:

FIG. 1 shows in plan view a sample film deposited on a substrate, the film etched into a circularly symmetric pattern, and FIG. 2 is a schematic representation of apparatus for analyzing the sample film illustrated in FIG. 1.

Referring in detail to FIG. 1, there is shown a substrate 10 on which a sample coating of a film 12 is deposited. The substrate 10 is, for example, a ceramic material such as alumina. The film is, for example, a 1000 Å film of aluminum, sputter deposited under preset conditions of deposition time and input power in a deposition chamber. Sputtering is a deposition technique specially vulnerable to surface nonuniformity. The deposition chamber, (not shown), for example forms one station in a production line for thin film circuits. To ensure that aluminum conductors produced when the film is etched are uniform and of a thickness required to show particular electrical characteristics, it is necessary initially to simulate deposition of the aluminum on the sample substrate 10. Accordingly, production parameters are fixed and the film is deposited over the entire surface of the sample substrate 10. The particular deposition conditions encountered may produce a layer which is too thick, too thin, may have some fixed or random thickness variation over the area of the substrate, or may simply not be as smooth as desired. Before a production run is started, variation from the ideal must be accurately measured and production parameters reset accordingly.

To particularly adapt the sample film 12 for such measurement, the film is defined into a circularly symmetric pattern of sectors or lands 14 using well-kniown photo-lithographic techniques or mechanical masking.

Referring now to FIG. 2, the substrate is supported with the film pattern upwards on a turntable 16 with a central point P of the pattern aligned as closely as possible with the rotational axis of the turntable. The turntable forms part of apparatus resembling a phono disc player, the apparatus having a pick-up arm 18 and an audio cartridge 20 including a stylus 22 and a transducer 24 for generating an electrical signal dependent on vertical oscillation of the stylus. In contrast with the conventional phono disc player, in which the pick-up arm is driven radially from grooves in a disc, the arm is stationary and the cartridge is driven radially inward and outward by a motor 26 mounted on the arm 18. In a simpler embodiment of the apparatus (not shown), the arm may be turned about a vertical shaft, the arm with its associated cartridge, having sufficient inertia that it is not moved by rotation of the turntable and substrate below the stylus. Also in contrast to the audio disc player, an electrical output from the transducer 24, instead of being converted to an audio output, is directed to signal analyzing circuitry shown in detail in FIG. 2.

As the substrate is rotated, a periodic signal is obtained as the stylus 22 traverses the sectors or lands 14 and the intervening areas of substrate 10. The substrate is rotated at an angular velocity such that the output signal from the cartridge 20 is of the order of 500 Hz. The rotational frequency of the turntable will depend on the number of sectors in the symmetric pattern on the substrate 10. If the sectors are extremely narrow, then the turntable should be rotated slowely otherwise the signal received will consist predominantly of hop and bounce as the stylus settles to a particular height. If the segments are fewer, the turntable can be rotated more quickly. In any event, subsequent signal analyzing circuitry is designed to neglect that signal information received in the periods that the stylus steps up and steps down. The information processed is that corresponding to passage of the stylus 22 over areas of film 12 and the substrate 10 after the stylus has settled. Typically the stylus itself is similar to the diamond or sapphire tipped audio styli used in phono disc players but the tip of the stylus should have a radius of curvature somewhat greater than that normally associated with phono styli. This helps to prevent the stylus from scratching the sample film as it traverses the substrate.

Output from the transducer 24 is fed to a filter network 28 having a passband centered at 500 Hz. The filter output is fed to an automatic gain control stage 30 which feeds an optimum amplitude signal to a phase locked loop network 32. This network locks onto the phase of the incoming periodic signal and has an output to a microprocessor 36 to permit the signal analyzing circuitry to track a particular frequency even if the pattern axis of symmetry P is not aligned with the turntable rotational axis.

The output from the filter network 28 is also taken to a programmable gain stage 34 controlled by the microprocessor 36 to ensure that the signal level is optimized for operation of an analog-to-digital converter 38.

The analog-to-digital converter output is directed to the micro-processor 36 where digital data is processed according to a timing input from the phase locked loop 32. Processing may take many forms depending on just what data on the sample substrate surface is to be derived and how it is to be used. In a general case, the numerical data derived from the transducer analog output for each step or land 14 is averaged over a large number of rotations of the sample substrate 10. The data can be inspected in the microprocesor 36 for point-to-point deviation and for gross deviation around the substrate 10. The microprocessor 36 can alternatively be used merely to give an overall average of film thickness around the substrate together with gross deviation information.

Another possibility is to program the microprocessor to compare the roughness of the film surface with that of the substrate surface.

It will be appreciated that the stylus 22 must be free to move up and down relative the tracking arm 18. In operation, since the stylus vertical vibration is rapid, the pick-up arm 18, having far greater inertia than the stylus, attains a vertical level which is substantially fixed. The stylus then oscillates relative to this level, the amplitude of oscillation producing a corresponding voltage output from the transducer 24.

As shown in the specific example, the sample film is etched into a circularly symmetric spoked pattern. This pattern is preferred since for rotation about a central axis, the transducer output has a periodicity associated both with the rotation of the turntable 16 and with the spaced lands 14, thus making signal analysis easier.

The substrate can alternatively support an asymmetric pattern, for example, an arrangement of film elements to be printed during production. In this case, in place of the phase locked loop, the microprocessor can be triggered each time the pattern is traversed. When the substrate is rotated by the turntable, transducer output is used to determine the position of the film pattern in relation to the turntable, both as to its position and to its angular rotation.

For analyzing the full extent of a film pattern as opposed to a thin annular region, the transducer cartridge 20 must be moved radially either continuously or in a stepping action by the motor 26. Depending on the thickness of the film being measured and the accuracy of results acquired, the turntable is rotated through a number of revolutions with the stylus at a particular distance from the axis of rotation. Data from the multiple revolutions is then averaged to provide relief data.

The last element in the signal analyzer is a display 40 driven by an output from the microprocessor 36. Using appropriate software control, a number of representations can be displayed. Thus a plan view of the film can be obtained in which thickness data is interpolated for etched regions and the plan view indicates, for example by black and white contrast, the areas of the film which are outside tolerances set for film thicknesses. In addition, sectional representations can also be selected with the scales chosen according to whether film thickness or roughness is to be displayed.

Although the invention has been described in terms of measuring the thickness of a film such as a region of an electrical circuit or a paint sample, the invention is concerned in its widest context with analyzing surface relief. Accordingly, as well as film thickness and profile, it can be used to determine and represent details of intaglio and cameo surfaces generally.

What is claimed is:

1. Apparatus for measuring the thickness of a coating comprising:
    a turntable for supporting and rotating a flat substrate bearing a regularly sectored coating pattern, wherein in use, the centers of the coating pattern and the turntable are substantially coincident;
    tracking means for bearing on a top surface of the patterned substrate, the tracking means vertically moveable in a direction perpendicular to the substrate;
    means for moving the tracking means radially of the turntable;
    a transducer operably connected to the tracking means for generating an electrical signal in response to vertical movement thereof;
    a band pass filter for passing a component of the transducer electrical output at a frequency corresponding to the frequency of traversal of the pattern sectors by the tracking means;

and means for measuring amplitude of the filtered signal to provide an indication of coating thickness.

2. Apparatus as claimed in claim 1 in which the transducer and the tracking means are mounted on an arm spaced from the upper surface of the turntable.

3. Apparatus as claimed in claim 2 in which the tracking means is a mechanical stylus.

4. Apparatus as claimed in claim 3 further comprising a motor for driving the stylus along the arm.

5. Apparatus as claimed in claim 1 in which the means for measuring amplitude includes an analog-to-digital converter for digitizing an output signal from the band pass filter an output from the analog-to-digital converter forming one input to a data processing means.

6. Apparatus as claimed in claim 5, further comprising a phase locked loop having an input from the band pass filter, the phase locked loop operable to generate a timing signal which timing signal is taken to the data processing means to compensate for any deviation of the digitized signal output of the analog-to-digital converter from a preset phase.

7. Apparatus as claimed in claim 5 further comprising position monitoring means for monitoring the position at which the tracking means bears on the top surface of the patterned substrate, the data processing means having a second input representing said position.

8. A method of measuring the thickness of a coating deposited on a surface by a coating process, the method comprising using said process to deposit onto a test substrate a regularly sectored coating pattern;
supporting the test substrate on a turntable with a center of the coating pattern substantially coincident with a center of the turntable;
bringing a tracking means to bear on a top surface of the patterned substrate, the tracking means being vertically moveable perpendicular to the substrate;
rotating the turntable;
simultaneously moving the tracking means progressively radially of the turntable;
obtaining from a transducer operably connected to the tracking means an electrical signal corresponding to relative vertical movement produced in the tracking means by passage of the rotating regularly sectored coating pattern thereby;
filtering the electrical signal to pass a component of the transducer electrical output at a frequency corresponding to the frequency of traversal of the patterned sectors by the tracking means;
and measuring the amplitude of an output signal from the filter to provide an indication of the coating thickness.

* * * * *